Figure 1:
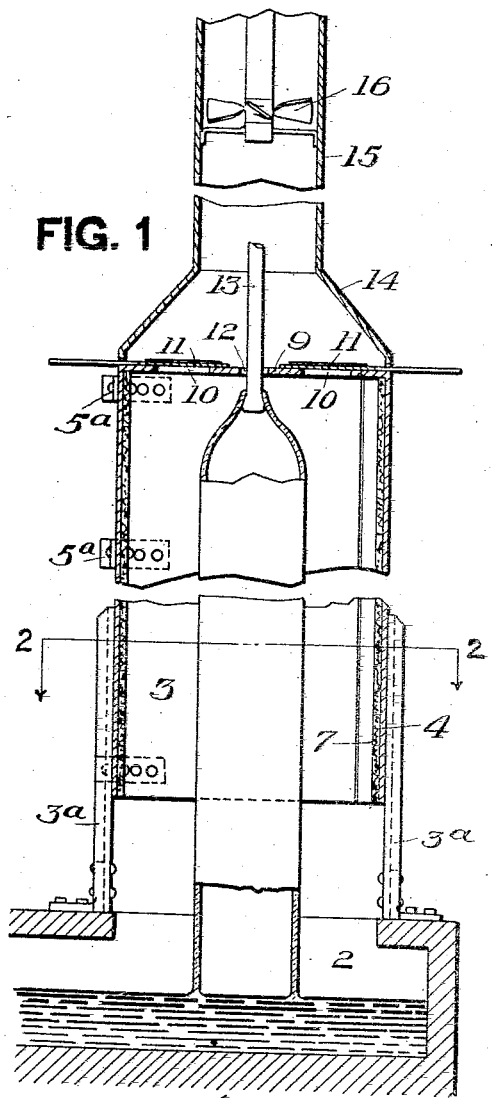

H. A. SCHNELBACH.
METHOD OF DRAWING GLASS CYLINDERS.
APPLICATION FILED JULY 9, 1908.

939,101.

Patented Nov. 2, 1909.

WITNESSES.
Walter Samariss
Robert C. Totten

INVENTOR.
Harry A. Schnelbach
By Kay & Totten
attorneys

UNITED STATES PATENT OFFICE.

HARRY A. SCHNELBACH, OF CRAFTON, PENNSYLVANIA.

METHOD OF DRAWING GLASS CYLINDERS.

939,101.  Specification of Letters Patent.  Patented Nov. 2, 1909.

Application filed July 9, 1908. Serial No. 442,723.

*To all whom it may concern:*

Be it known that I, HARRY A. SCHNELBACH, a resident of Crafton, in the county of Allegheny and State of Pennsylvania, have invented a new and useful Improvement in Methods of Drawing Glass Cylinders; and I do hereby declare the following to be a full, clear, and exact description thereof.

My invention relates to a method of drawing glass cylinders such as employed in connection with the manufacture of window glass. In the manufacture of these cylinders it has been customary to lower a bait on the end of a blow-pipe into a molten mass of glass and then draw up the blow-pipe with the glass adhering thereto, and admitting air to the blow-pipe to retain the cylinder in cylindrical form until the cylinder is drawn out to the desired length. In the manufacture of these cylinders in this manner one of the greatest difficulties encountered is due to the unequal cooling of the cylinder as it is drawn, the lower portion of the cylinder being subjected to a higher temperature than the upper portion of the cylinder, and as a consequence there is an unequal contraction in cooling which causes the cracking or breaking of the cylinder which results in great loss and waste of material. This prevents the drawing of the cylinders to long lengths with any degree of certainty.

The object of my invention is to utilize the waste heat given off by the molten glass and so distribute this heat in the drawing operation as to obtain a substantially uniform cooling of the cylinder and so prevent the cracking or breaking of the same, due to unequal contraction.

In the accompanying drawing I have illustrated a form of apparatus suitable for carrying out my invention in which—

Figure 2:
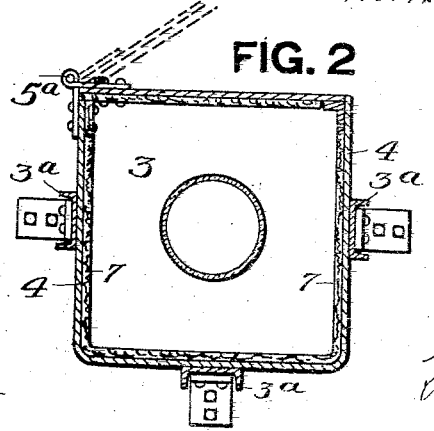

Figure 1 is a sectional elevation of my improved apparatus; and Fig. 2 is a cross section on the line 2—2 Fig. 1.

Referring to the drawings the numeral 2 designates the pot or receptacle containing the molten glass, said receptacle being of sufficient size to contain the amount of glass necessary to draw the length of cylinder desired. Supported above the receptacle 2 is the box or chamber 3, said box being supported by the frame work 3ª. This box 3 may be composed of the outer walls 4 formed of metal of suitable thickness and with the inner wall or lining 7 of asbestos or other suitable material. This box 3 is supported at a suitable distance above the receptacle 2 and the space left between the bottom of said box and said receptacle permits of the inspection of the cylinder during the drawing operation, as fully hereinafter set forth.

One side of the box 3 forms a door and is hinged, as at 5ª, to the box. The box 3 is closed at the top and accordingly is provided with the top plate 9 which is provided with the openings 10 controlled by suitable dampers 11. The top 9 is further provided with the opening 12 through which the blow-pipe 13 passes. The box 3 may be provided with the hood 14 with the extension 15 extending up therefrom and in said extension a suitable fan 16 may be located for creating the proper draft.

In carrying out my improved method with the above apparatus the bait is lowered in the usual manner and the glass cylinder is then drawn upwardly. As the cylinder rises the attendant has full opportunity to watch the glass as it rises from the receptacle and is thus able to tell whether the glass is drawing properly or not. As the cylinder is drawn it extends up within the box 3 and the heat given off from the molten glass rises within the box 3 and by means of the dampers 11 the heat may be properly controlled and regulated so as to give the proper heat and maintain a substantially even temperature throughout the box or chamber 3. A certain portion of the heat will escape through the open space left between the bottom of the box 3 and the receptacle 2, the amount of heat escaping in this manner being controlled by the dampers 11. In this manner also the glass is permitted to set to enable the operator to control the thickness and provide a uniform thickness of glass. The glass thus becomes set and is not maintained in a plastic condition by the heat rising from the molten body of glass below, being subject to the atmospheric conditions at this point. The draft which draws the heat up through the chamber 3 may be increased by the aid of the fan 16 and thereby the proper amount of draft is always insured. The waste heat given off by the molten glass in the receptacle 2 is thus utilized to maintain the proper temperature within the box 3 and the temperature is so controlled that the upper end of the cylinder is maintained at substantially the same heat as that portion at the lower end of the box 3 so that there is practically no liability of the unequal contraction when the cylinder cools. As soon as the cylinder has been drawn to the desired length the door 5 is opened and the cylinder is removed and withdrawn from the box.

As long as the heat is ascending from the molten glass the atmosphere will not enter the space below the box but a certain amount of the heat will be permitted to escape whereby the glass is cooled at that point and allowed to set to prevent undue stretching or elongating the same, while at the same time said open space permits of the operator inspecting the cylinder as it is drawn in order to determine whether it is being drawn properly and if not he can readily adjust the dampers 11 so as to produce the desired result.

In the above manner, by regulating and controlling the heat by the dampers 11 any desired temperature may be maintained within the box 3 so as to keep the cylinder surrounded by a substantially uniform temperature throughout the length of said box to prevent the cooling of the upper end of the cylinder to any appreciable extent before the lower end of said cylinder within said box is cooled, whereby the cracking or breaking of the cylinder due to unequal contraction is obviated.

What I claim is:

1. The method of drawing cylindrical glass articles, consisting in drawing the article from a molten body of glass up through an inclosed space, creating a draft up through said inclosure, directing the heat from the molten glass up and around the cylinder during the drawing operation, and maintaining an even heat or a substantially even heat around that portion of said cylinder within said inclosed space.

2. The method of drawing cylindrical glass articles consisting in drawing the article from a molten body of glass up through an inclosed space, exposing the lower portion of said cylinder above said molten body of glass to atmospheric temperature conditions, directing the heat from the molten glass up and around said cylinder during the drawing operation, and maintaining an even or a substantially even heat around that portion of said cylinder within said inclosed space by controlling the draft.

3. The method of drawing cylindrical glass articles, consisting in drawing the article from a molten body of glass up through an inclosed space, permitting a certain portion of heat arising from said molten body of glass to escape at a point below the inclosed space, and maintaining an even or a substantially even heat around that portion of the cylinder contained within said inclosed space.

In testimony whereof, I the said HARRY A. SCHNELBACH have hereunto set my hand.

HARRY A. SCHNELBACH.

Witnesses:
 L. P. FLICKINGER, Jr.,
 L. P. FLICKINGER.